Sept. 21, 1948.   W. LEATHERS ET AL   2,449,661
MAGNETIC LEVELING DEVICE FOR GYROSCOPIC ROTORS
Filed Dec. 29, 1945

INVENTORS.
WARD LEATHERS
BY GEORGE S. Di MONICO

ATTORNEY

Patented Sept. 21, 1948

2,449,661

UNITED STATES PATENT OFFICE 2,449,661

MAGNETIC LEVELING DEVICE FOR GYROSCOPIC ROTORS

Ward Leathers and George S. Di Monico, Brooklyn, N. Y., assignors to International Business Machines Corporation, New York, N. Y., a corporation of New York Application December 29, 1945, Serial No. 638,397

2 Claims. (Cl. 74—5)

The present invention relates to magnetic leveling devices for gyroscopic rotors and the principal object thereof is to afford a means which will insure that the axis of a gyroscopic rotor, after the same has started and attained its normal rate of speed, shall assume a substantially horizontal position or direction relative to the earth's surface.

The present invention makes use of a well-known principle sometimes associated with gyro vertical devices for erecting purposes wherein erecting is attained by the provision on the gyro rotor of a mass of non-magnetic metal, which is designed for cooperation with a pendulously supported magnetic system wherein when the axial direction of the rotor departs from the vertical, the reaction of the eddy currents generated in the mass of metal within the magnetic field afforded by the magnetic system brings the axis of the rotor back to the vertical.

According to the present invention, in order to normally maintain the axis of the gyro rotor horizontal, a pendulously supported permanent magnet is employed, and this magnet is of such mass and is so arranged in the pendulous supporting system therefor that it will at all times exert an influence on the rotating body of metal tending to create eddy currents within the mass of metal which are of such a nature that they will normally maintain the axis of the rotor horizontal.

In carrying out the principles of the present invention in a preferred form thereof, the pendulously supported member is pivotally suspended in the horizontal plane of the gyro rotor axis and preferably in the plane of vertical tilting movement of which the rotor is capable. The pendulous member is preferably of angular form providing in effect a pair of angularly disposed arms having balanced effective masses on each side of the vertical plane of its suspension and having a predetermined equivalent pendulum action. One of the arms serves to support thereon a magnet, which is of the permanent type and which has an effective pole axis which, when the pendulous member as a whole is at rest, exists in the horizontal plane of the rotor axis, so that when there is a tendency for the gyro rotor axis to deviate from the horizontal, the aforementioned eddy currents will be set up in the rotating mass of metal to bring the axis back to its normal horizontal position.

Due to the more or less complicated structure of modern gyroscopes, and principally due to the lack of space existing within the casings of such gyroscopes, the pendulous member above referred to has been designed to conform to small space requirements. Toward this end, the member is of irregular bowed shape having a relatively short effective pendulum arm on one side of the plane of suspension thereof and a somewhat longer pendulum arm on the other side thereof, this latter arm at all times remaining horizontal and being of a sufficient length as to permit supporting of the permanent magnet outside the mass of rotating metal which is carried on the end of the gyroscopic rotor near the inside confines of the gyroscope casing. In this manner, the pendulous support for the permanent magnet in no way interferes with the other operable parts of the gyroscope.

The provision of an apparatus of the character briefly outlined above being the principal object of the invention, other objects and advantages thereof will appear as the nature of the invention is better understood.

In the accompanying single sheet of drawings.

Figure 1:
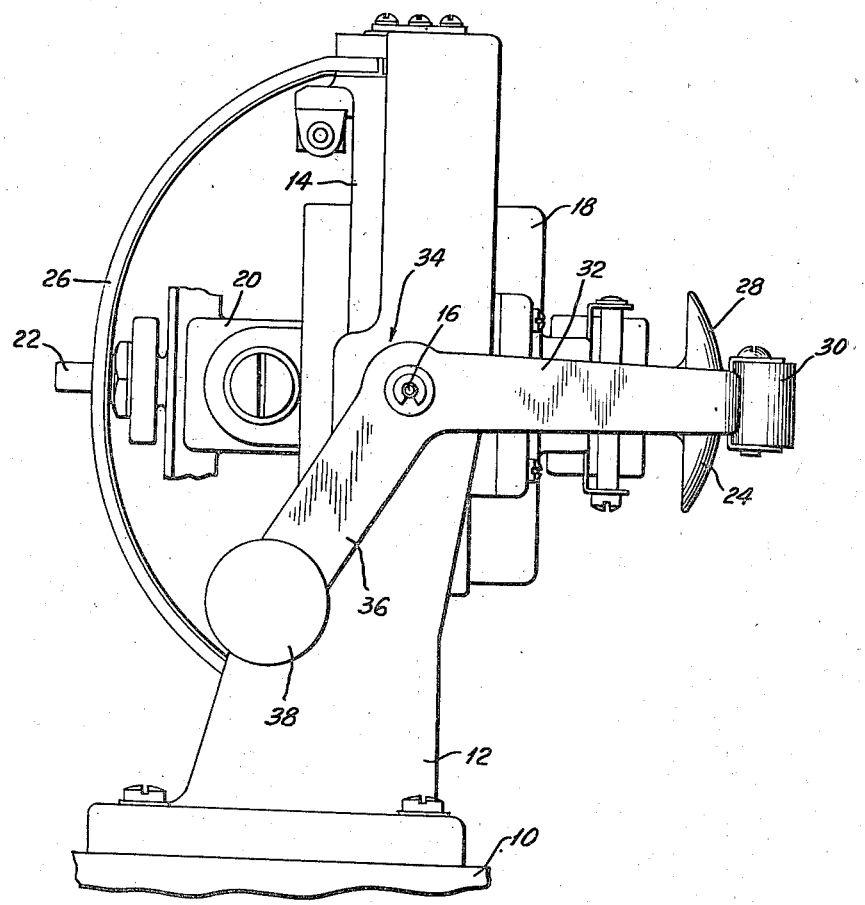
Fig. 1 is a fragmentary, side elevational view of a gyroscopic rotor and a portion of its supporting mechanism to which the improved leveling device has been applied.

Referring now to the drawings, a portion of the gyroscopic casing is designated in its entirety at 10 and has mounted thereon a frame member or standard 12, which is generally of bowed shape and serves to support thereon the usual gimbal ring 14 within which there is supported upon a horizontal axis 16 the gyro rotor 18 which is adapted to be electrically driven by means of a motor, the housing for which is shown at 20. The rotor 18 is mounted upon a shaft 22 on which there is disposed one element 24 of the improved leveling device comprising the present invention. The gyroscope also has associated therewith a series of caging bows, one of which is shown at 26, and these caging bows operate by suitable mechanism, not shown, to normally bring the axis of the shaft 22 to a predetermined convenient operating position within the casing 10. The caging mechanism briefly outlined above forms no part of the present invention and the showing thereof herein is purely incidental.

The element 24 of the leveling device consists of a mass of non-magnetic metallic material which, if desired, may be copper, aluminum or the like. The element 24 is preferably formed with a fragmentary spherical outer surface 28 of a radius appreciably shorter than the distance existing from the end of the shaft 22 on which it is mounted to the tilt axis 16 of the rotor 18. The member 24 is adapted to cooperate with a magnetic system including a permanent magnet 30 carried medially of a bowed member 32 which, together with the magnet, constitutes one balanced arm or element of a pendulum assembly designated in its entirety at 34 and which is pivotally supported for pendulous swinging movement about the axis 16. The inner ends of the bowed member 32 are formed with angularly disposed extensions 36 which extend downwardly and rearwardly of the frame member 12 and carry at their lower ends respective weights 38 which are preferably of disc-like configuration. The extensions 36 and weights 38 carried thereby constitute the other balanced arm or element of the pendulum assembly 34.

As will be pointed out presently, the pendulum assembly 34, including the elements 32 and 36, magnet 30 and weights 38, is designed and supported so that the magnet 30 normally assumes a position when the pendulum member 34 is at rest wherein it exerts a magnetic influence substantially in the horizontal plane of the axis 16. It will be apparent that if the axis of the gyroscopic rotor 18 deviates from the horizontal position, the disc-like mass of metal 24 will become asymmetrically placed with respect to the magnetic pole of the magnet 30, thus resulting in the generation of eddy currents in the disc, the reaction of which is such as to slowly restore the axis of rotation of the disc to its normal horizontal position.

It has been stated above that the rotary member 24, which is of sectional spherical design, is preferably of non-magnetic conducting material and in this case the leveling force acting upon the rotor is produced by eddy currents therein. If, however, this member is made of a magnetic material, as for example, steel, a similar leveling action will take place under the influence of magnetic hysteresis.

It is to be noted that because of the fact the radius of swinging movement of the magnet 30 is centered on the axis 16, and because of the fact that the radius of curvature of the spherical surface of the member 24 is shorter than this radius of swinging movement, the greater the departure of the pendulum member 34 from its position of rest and the greater will become the distance of the magnet 30 from the member 24. In this manner the magnet 30 exerts its greatest influence upon the member 24 when these members are in alignment and this feature is relied upon to lessen the leveling effect of the eddy currents in the member 24 when the pendulum member 34 is subject to departure resulting from quick turns, acceleration or the like, if the gyroscope is employed as a direction indicator in connection with a movable vehicle, such as an airplane.

It is essential to gyroscopic erecting structures of this character that the returning couple or force applied to the gyro rotor be not too severe when sudden large displacements take place. This is even more important in connection with gyro-horizontals than with gyro-verticals because of the relative pendulous instability of the erecting elements where gyro-horizontals are concerned. Where no attempt is made to brake the pendulous action of the swinging mass a relatively high and frequent bobbing effect is attained when the gyro is employed on moving vehicles, especially airplanes. It is the mean value of these frequent and large displacements that actually performs the erecting operation. The pendulous member is not expected to remain motionless and, in flight, it practically never comes to a position of rest. It is always on the move, passing, as it does, across the mean position in opposite directions with each cycle of swinging movement. As it moves progressively away from its mean position in either direction, its increasing eccentricity with respect to the mass of non-magnetic metal increases the lines of force that are cut by the rotating increments of the mass of metal, but at the same time, because its distance from the curved surface of the mass of metal increases, the magnetic field becomes weaker in proportion to the square of the distance existing between the two surfaces. These opposing factors are intended to substantially counterbalance each other so that a uniform returning couple is applied to the rotor, regardless of the position of the magnet 30.

If, due to a change in direction or speed of the airplane, the pendulous member assumes a sudden swing of large amplitude, it is not desired that the gyro rotor shall be displaced appreciably at that moment. Rather it is preferred that in any position of the magnet 30 the pendulous member shall have a constant effect on the gyro rotor.

Figure 2:
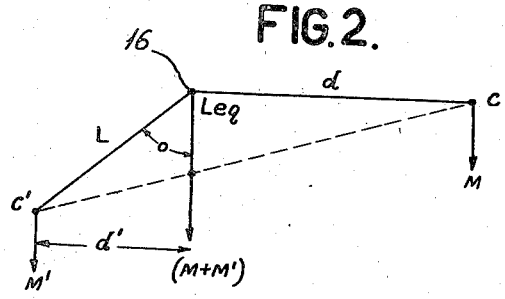
Fig. 2 is a schematic view illustrating certain physical principles involved in connection with the present invention.

Referring now to Fig. 2, the center of mass of that portion of the pendulum member 34 existing on one side of the vertical plane extending through the supporting axis 16 is shown at $c'$, while the center of mass of that portion of the pendulum member 34 existing on the other side of the plane is indicated at $c$. Thus for a balanced condition of the pendulum member $$M'd' = Md$$

wherein $M'$ equals the mass of the pendulum member on one side of a vertical plane extending through the axis 16, $M$ equals the mass on the other side of the vertical plane, $d'$ equals the distance from the center $c'$ to the vertical plane, and $d$ equals the line from the center $c$ to the vertical plane.

In Fig. 2, L represents the line extending from the center $c'$ to the axis 16, while the angle $\theta$ represents the angle of the line L from the vertical. With the line $d$ extending in a horizontal direction, it is disposed at a 90° angle to the vertical plane.

From the above conditions, the length $Leq$ of an equivalent pendulum having mass equal to $(M'+M)$ is equal to $$\frac{dL \cos \theta}{d + L \sin \theta}$$

Under all conditions that satisfy the above requirements the longitudinal axis of the arms 32 will at rest assume a horizontal position so that the effective magnetic axis exerted by the magnet 30 will occupy a position within the horizontal plane of the pivotal axis 16.

In the design of the pendulum member 34, the axis of the bowed portions 32 is horizontal and the magnet 30 is centered thereon. It is obvious, however, that the shape of the mass of the pendulum member 34 on this same side of the vertical plane passing through the suspension point 16 may be varied in shape or weight to raise or lower the center of gravity thereof and, in such an instance, the position of the magnet 30 relative to the mass as a whole may be raised or lowered, the essential point being that this magnet should operate with its pole piece substantially in a horizontal plane passing through the suspension point 16.

While there have been shown and described and pointed out the fundamental novel features of the invention as applied to a preferred embodiment, it will be understood that various omissions and substitutions and changes in the form and details of the apparatus illustrated and in its operation may be made by those skilled in the art without departing from the spirit of the invention. It is the intention, therefore, to be limited only as indicated by the scope of the following claims.

What is claimed is:

1. The combination with a freely suspended gyroscopic rotor, of means for normally urging the rotor to a position wherein its rotational axis is substantially horizontal, said means comprising a pendulously supported member, means pivotally supporting said member from the horizontal plane of the gyroscopic rotor axis, said member having balanced effective masses on each side of the vertical plane of its suspension the resultant center of gravity of which is below said plane, a mass of non-magnetic metal mounted on the rotor of the gyroscope and rotatable therewith, and a permanent magnet mounted on said pendulously supported member and forming an increment of one of said balanced masses, said magnet having a pole cooperating with said mass of non-magnetic metal and the magnetic axis of said pole being normally maintained coincident with said horizontal plane of the gyroscopic rotor axis, said mass of non-magnetic metal presenting to said pole a convex surface of a radius of curvature less than the distance from the axis of pivotal support for the pendulous member to the cooperating pole surface of the magnet whereby progressive displacements of said magnet from said horizontal plane will effect corresponding decrease in the strength of the magnetic field applied to said non-magnetic mass of metal.

2. The combination with a freely suspended gyroscopic rotor, of means for normally urging the rotor to a position wherein its rotational axis is substantially horizontal, said means comprising a pendulously supported member, means pivotally supporting said member from the horizontal plane of the gyroscopic rotor axis, said member having balanced effective masses on each side of the vertical plane of its suspension, said pendulous member having an equivalent pendulum action equal to $$\frac{dL \cos \theta}{D + L \sin \theta}$$

wherein $d$ equals the distance of the center of gravity of one balanced mass from said plane of suspension, $L$ equals the distance of the center of gravity of the other balanced mass from the axis of suspension, and $\theta$ equals the angle existing between said vertical plane and a plane passing through the center of gravity of said latter balanced mass and said axis of suspension, a permanent magnet carried by and forming a part of said first balanced mass and having an effective pole axis extending substantially through the horizontal plane passing through the center of gravity of said specified balanced mass, and a mass of non-magnetic metal mounted on the rotor of the gyroscope and rotatable therewith and cooperating with said permanent magnet, said mass normally being in close proximity to said magnet and presenting to the inner surface of the latter a convex surface having a radius of curvature appreciably less than the distance existing between the point of pivotal support of the pendulously supported member and the opposed inner surface of the magnet.

WARD LEATHERS.
GEORGE S. DI MONICO.

REFERENCES CITED

The following references are of record in the file of this patent:

UNITED STATES PATENTS

| Number | Name | Date |
|---|---|---|
| 1,825,345 | Fieux | Sept. 29, 1931 |
| 2,339,606 | Sias | Jan. 18, 1944 |
| 2,365,727 | Pike | Dec. 26, 1944 |
| 2,418,032 | Jewell | Mar. 25, 1947 |

FOREIGN PATENTS

| Number | Country | Date |
|---|---|---|
| 359,071 | Great Britain | Mar. 6, 1931 |